US005998218A

United States Patent [19]

Conley et al.

[11] Patent Number: 5,998,218

[45] Date of Patent: *Dec. 7, 1999

[54] CALIBRATION SYSTEM FOR AN ELECTRONICALLY MONITORED MECHANICAL PIPETTE

[75] Inventors: Paul G. Conley, St. Charles; Eugene R. Appal, Florissant, both of Mo.

[73] Assignee: Sherwood Services AG, Schaffhausen, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,371

[22] Filed: Sep. 9, 1997

Related U.S. Application Data

[60] Provisional application No. 60/025,871, Sep. 9, 1996.

[51] Int. Cl.[6] ..................... G01N 1/14

[52] U.S. Cl. ..................... 436/180; 422/100; 73/3; 73/1 H; 73/864.16; 73/864.18

[58] Field of Search ..................... 422/100, 105, 422/107, 108; 73/864.16, 864.18, 3, 1 H; 364/496, 497; 436/50, 174, 180

[56] References Cited

U.S. PATENT DOCUMENTS

| | | | |
|---|---|---|---|
| 3,805,034 | 4/1974 | Klein et al. | 235/150.24 |
| 3,824,455 | 7/1974 | Levitt et al. | 324/24 R |
| 3,933,048 | 1/1976 | Scordato | 73/425.6 |
| 4,009,611 | 3/1977 | Koffer et al. | 73/425.6 |
| 4,054,062 | 10/1977 | Branham | 73/425.6 |
| 4,096,750 | 6/1978 | Sturm | 73/425.4 |
| 4,096,751 | 6/1978 | Withers et al. | 73/425.6 |
| 4,099,548 | 7/1978 | Sturm et al. | 141/27 |
| 4,327,595 | 5/1982 | Schultz | 73/864.12 |
| 4,418,580 | 12/1983 | Satchell et al. | 73/864.13 |
| 4,442,722 | 4/1984 | Meyer | 73/864.18 |
| 4,567,780 | 2/1986 | Oppenlander et al. | 73/864.16 |
| 4,671,123 | 6/1987 | Magnussen, Jr. et al. | 73/864.16 |
| 4,757,437 | 7/1988 | Nishimura | 364/167 |
| 4,779,467 | 10/1988 | Rainin et al. | 73/864.17 |
| 4,821,586 | 4/1989 | Scordato et al. | 73/864.18 |
| 4,896,270 | 1/1990 | Kalmaskis et al. | 364/479 |
| 4,905,526 | 3/1990 | Magnussen, Jr. et al. | 73/864.18 |
| 5,002,737 | 3/1991 | Tervamaki | 422/100 |
| 5,021,217 | 6/1991 | Oshikubo | 422/100 |
| 5,187,990 | 2/1993 | Magnussen, Jr. et al. | 73/864.18 |
| 5,746,005 | 5/1998 | Steinberg | 33/1 PT |

*Primary Examiner*—Long V. Le
*Attorney, Agent, or Firm*—Mark S. Leonardo; Brown, Rudnick, Freed & Gesmer

[57] ABSTRACT

The present invention relates to a calibration system for an electronically monitored mechanical pipette. The calibration system is used to calibrate an electronic volume monitoring system which includes a transducer assembly and an electronics assembly which monitors a volume delivery adjustment mechanism of the pipette. The calibration system includes either a calibration mapping technique for determining the proper fluid volume delivery setting, or alternatively, an algorithmic technique. The calibration method further includes the ability to calibrate the pipette at a specific fluid volume delivery setting without modifying any parameters of the calibration software.

12 Claims, 10 Drawing Sheets

CALIBRATION SYSTEM FOR AN ELECTRONICALLY MONITORED MECHANICAL PIPETTE

This application claims priority based on Provisional Application Ser. No. 60/025,871 filed Sep. 9, 1996.

BACKGROUND OF THE INVENTION

1. Field of the Invention

The invention relates generally to an electronically monitored mechanical pipette. More specifically, the invention relates to a calibration system used with an electronically monitored mechanical pipette.

2. Prior Art

Mechanically operated micropipettes are well known in the art as exemplified by U.S. Pat. No. 4,909,991 to Oshikubo. In such prior art devices, the volume of liquid to be dispensed by the pipette is generally indicated to the operator by means of a mechanical display. The display commonly consists of a set of rotary drums driven by a gear mechanism attached to the actuating shaft of the pipette, such that rotation of the actuating shaft causes the drums to rotate to display a new setting. However, due to unavoidable mechanical wear and tear on pipettes, the amount of fluid actually being delivered by a pipette may not actually correspond to the volume being indicated by the mechanical displayed. Further, accuracy may degrade over time as the actuating elements, such as the shaft, gears, and rotary drum, wear out.

Electrically driven pipettes are also well known in the art as exemplified by U.S. Pat. No. 4,905,526 to Magnussen, Jr. et al. This type of instrument commonly includes an electronic display for displaying the volume of fluid to be dispensed by the pipette, and an actuator generally composed of an electric drive mechanism, such as a stepper motor. The stepper motor generally drives a rotor, which is attached by a threaded screw to an actuator shaft, the threaded screw changes the rotational motion of the motor into linear motion of the actuator shaft. The shaft thereafter drives a piston to displace fluid for pipetting. Although electrically operated pipettes have some advantages over mechanically operated pipettes, they nevertheless suffer from several drawbacks. Mainly, the enlarged size of an electrically operated pipette, due to the need to accommodate the electric driving mechanism, and the added electronic hardware, make the device very difficult to handle for the operator. Further, the software needed to compute the fluid volume delivery setting is somewhat complicated due to the lack of a monitoring assembly used to specifically monitor the volume delivered by the electric drive mechanism.

Electrically monitored mechanical pipettes are also known in the art as exemplified by U.S. Pat. No. 4,567,780 to Oppenlander et al. This type of instrument generally includes a plunger having an adjustable stroke length which is generally adjusted by rotating the plunger itself. The electrical monitoring system monitors plunger rotation and electronically displays the volume delivery setting corresponding to the plunger position. The device continuously monitors the plunger position and volume delivery setting of the pipette by means of a potentiometer. Although this device overcomes several of the disadvantages of mechanical and electrical pipettes, it nevertheless fails to completely resolve the problem of high power demands during operation. Further, the use of a potentiometer to monitor the position of the plunger is sometimes not desirable.

Electrically driven pipettes which include a transducer assembly are also well known in the art as exemplified by U.S. Pat. No. 4,821,586 to Scordato et al. This instrument uses a Hall-effect transducer to indicate when the volume delivery adjustment mechanism thereof is in its "home" position. And therefore ready to be set to a desired volume delivery setting. However, the volume delivery setting is calculated based on the number of pulses applied to the windings of an actuation motor, when in turn determines the number of steps a threaded element rotates through a known pitch threads. This indicates the distance the plunger moves longitudinally from the "home" position, thus determining the stroke of the piston and the volume of fluid which will be aspirated into the tip of the pipette. Although the electrically driven pipette uses a Hall-effect switch to assist in positioning the volume delivery adjustment mechanism, it nevertheless suffers from several drawbacks. First, the Hall-effect transducer is used only as a switch to indicate a "home" position from which a volume delivery setting can be made, instead directly monitoring the entire range of movement of the volume delivery adjustment mechanism and thereby directly indicating all positions of the mechanism to the electronic assembly of the unit. Therefore, fluid delivery setting cannot be determined directly from the output of the Hall-effect transducer.

OBJECTS AND SUMMARY OF THE INVENTION

The principal object of the present invention is to provide an electronically monitored mechanical pipette which includes a calibration system which requires no mechanical adjustment of the pipette for recalibration.

A further object of the present invention is to provide an electronically monitored mechanical pipette with a calibration system which allows for calibration of the pipette at any desired fluid delivery setting, so that the pipette is calibrated specifically to maximize accuracy at the fluid delivery setting desired.

A further object of the present invention is to provide an electronically monitored mechanical pipette which includes a calibration system which does not lose accuracy due to normal wear and tear of the internal mechanical mechanism of the pipette.

Another object of the present invention is to provide an electronically monitored mechanical pipette having an electronic volume monitoring system which utilizes a monitoring assembly and an electronics assembly to monitor the position of a volume delivery adjustment mechanism and to compute and display fluid volume delivery settings.

Briefly, and in general terms, the present invention provides for electronically monitoring a mechanical pipette with an electronic volume monitoring system which includes a transducer assembly and an electronics assembly which allow monitoring and indicating of the position of the volume delivery adjustment mechanism of the pipette, and which also allows general calibration of the pipette with the added ability of specific calibration of the pipette at a desired fluid volume delivery setting.

In the presently preferred embodiment, shown by way of example and not necessarily by way of limitation, an electrically monitored mechanical pipette made in accordance with the principles of the present invention includes a volume delivery adjustment mechanism which includes a plunger, an advancer, a driver, and a threaded bushing. The volume delivery adjusted mechanism is monitored by an electrical volume monitoring system which preferably includes a transducer assembly having two Hall-effect sensors, and an electronics assembly which includes a microprocessor and a display. During volume delivery adjustment, the sensors send a set of transducer signals to the electronics assembly, which computes and displays the new fluid volume delivery setting.

A microswitch assembly is provided for detecting relative rotational motion between the volume delivery adjustment mechanism and the pipette and to signal the electronics assembly that the fluid volume delivery setting is being changed. Upon receipt of a signal, such as an interrupt signal, from the microswitch, the electronics assembly powers up the transducer assembly which then tracks the motion of the volume delivery adjustment mechanism. The transducer sensor signals are received by the electronics assembly which computes and displays the new fluid volume delivery setting. Once the volume delivery adjustment mechanism is no longer being rotated, the electronics assembly shuts down the power to the transducer assembly to minimize power use of the pipette.

The electronics assembly preferably computes the new fluid volume delivery setting based on comparison of the transducer sensors signals with a calibration map which had been previously generated and loaded into the microprocessor thereof by rotating the volume delivery adjustment mechanism through one full revolution and recording the transducer sensor signals at predetermined rotational intervals. The transducer sensor signals received by the microprocessor thereafter are compared to the calibration map and the predetermined fluid volume delivery setting associated with the transducer signal values on the calibration map is then displayed. The fluid volume delivery setting associated with any particular set of values in the calibration map can be reset at any time by the operator. Due to this ability, the operator can check the actual fluid volume being delivered by the pipette at any displayed setting, and adjusts the display setting to the actual volume being delivered. In this manner, the pipette 10 is calibrated for delivery of exact fluid volume at the desired fluid volume delivery setting.

In an alternative embodiment, the microprocessor of the electronics assembly can be preprogrammed with an algorithm which computes the fluid volume delivery setting based on the transducer sensor signals being received.

These and other objects and advantages of the present invention will become apparent from the following more detailed description, when taken in conjunction with the accompanying drawings in which like elements are identified with like numerals throughout.

The transducer assembly is preferably a Hall-effect transducer which detects the magnitude of a magnetic field. In the preferred embodiment of the Hall-effect transducer, an annular magnet is positioned about a magnet bearing which will rotate with the rotating elements of the volume delivery adjustment mechanism while the remainder of the transducer assembly remains stationary with respect to the pipette. As the annular magnet rotates, its magnetic field relative to any fixed point, varies sinusoidally. The transducer assembly preferably includes more than one sensor, each spaced 90° apart from each other. When two sensors are used, the output of the sensor is 90° out of phase with the other sensor. When the magnet rotates within the transducer assembly, the resulting output is two sinusoidal signals, one signal being 90° out of phase from the other.

The sine-cosine combination of output signals from the two sensors allows the electronic assembly of the pipette to pin point the precise rotational position of the volume delivery adjustment mechanism and also the direction in which the volume delivery adjustment mechanism is being adjusted.

The annular magnet used in the transducer assembly of the present invention is manufactured to cause its north and south pole to be located at points on the circumference of the annular magnet, 180° apart from each other, instead of being positioned from the top and bottom of the annular magnet. In this manner, rotation of the annular shaped magnet causes the north and south poles thereof to alternatively rotate past the sensors as the volume delivery adjustment mechanism is rotated.

The electronics assembly of the pipette condition and process these signals received from the transducer assembly. Each transducer signal is fed into a microprocessor of the electronics assembly and the voltage thereof is measured. This input is used by the microprocessor as input data to an algorithmic computation of the present fluid volume delivery setting which is then displayed. Alternatively, the microprocessor may be preprogrammed with a map of transducer output values which the microprocessor can match to the signals being received. Each set of values in the map corresponds to a particular fluid volume delivery setting which the microprocessor causes to be displayed.

These and other objects and advantages of the present invention will become apparent from the following more detailed description, when taken in conjunction with the accompanying drawings in which like elements are identified with like numerals throughout.

DETAILED DESCRIPTION OF THE PREFERRED EMBODIMENT

Figure 1:
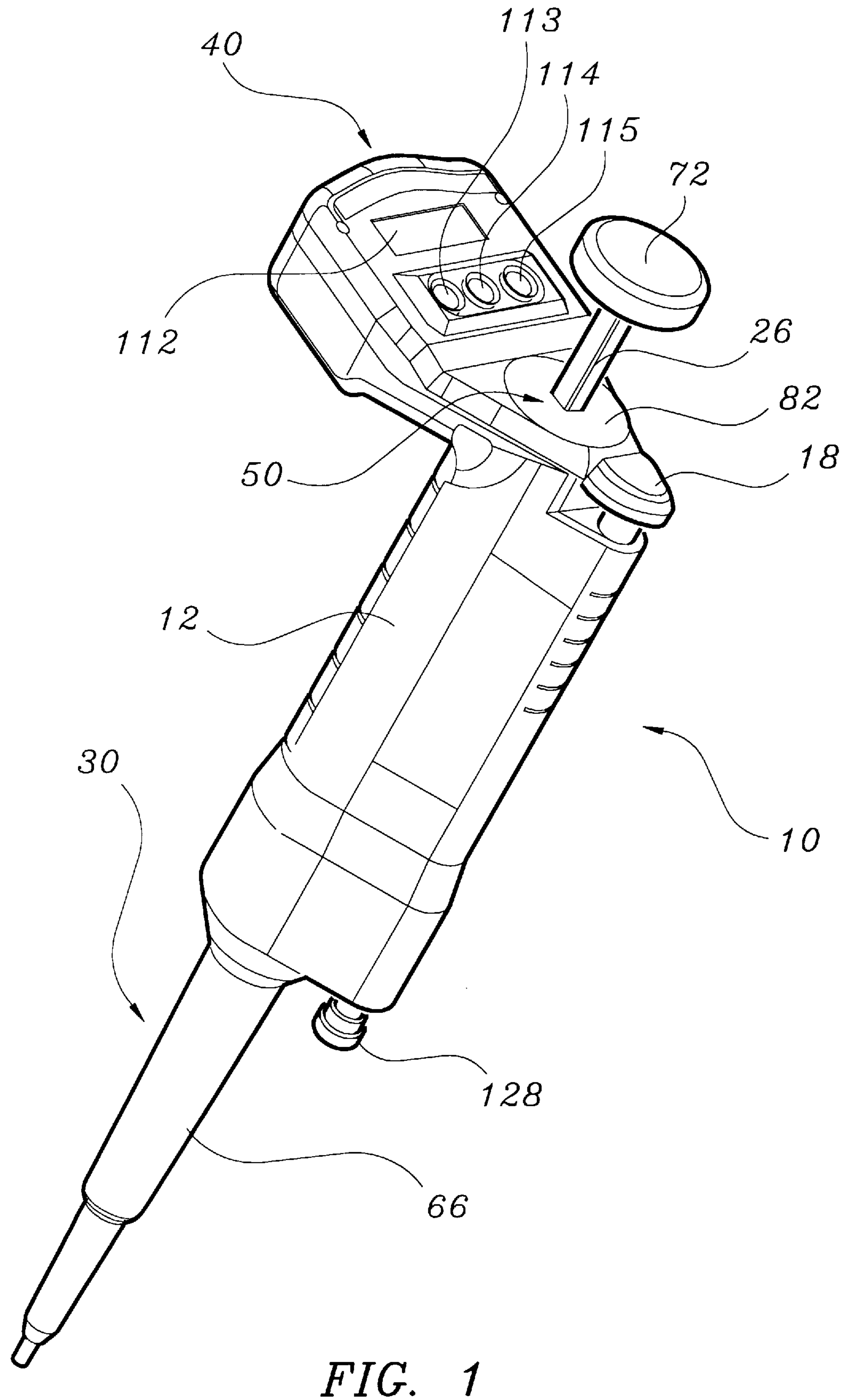
FIG. 1 is a perspective view of a pipette made in accordance with the principals of the present invention.

As shown in the exemplary drawings for the purposes of illustration, an embodiment of an electronically monitored mechanical pipette made in accordance with the principals of the present invention, referred to generally by the reference numeral 10, is provided with electrical volume monitoring system having a transducer assembly for monitoring the position of the volume delivery adjustment mechanism thereof and an electronic assembly for calculating and displaying the fluid volume delivery setting based on the input received from the transducer assembly and for accurate calibration of the pipette at any desired fluid volume delivery setting.

Figure 2:
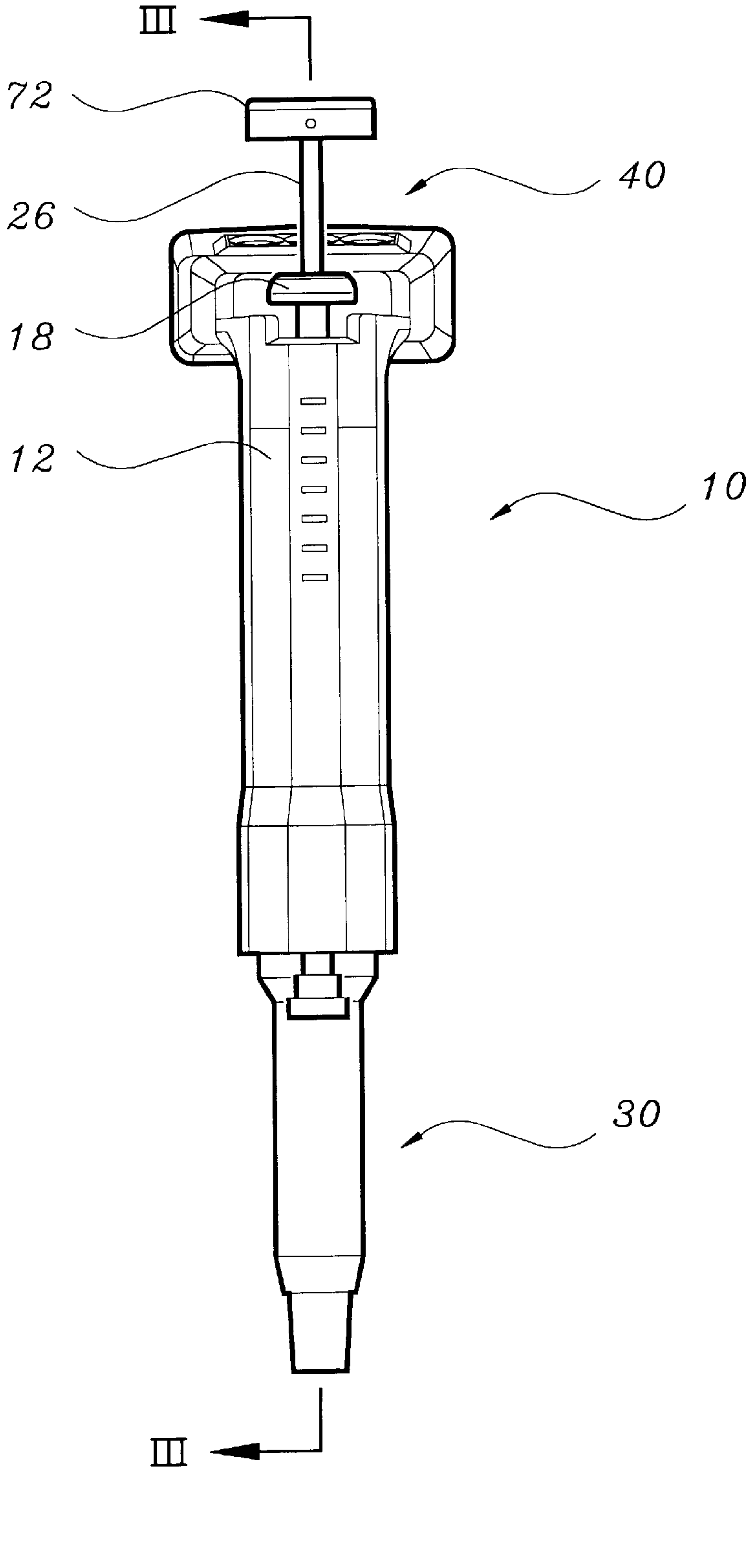
FIG. 2 is a front view of the pipette of FIG. 1.
Figure 3:
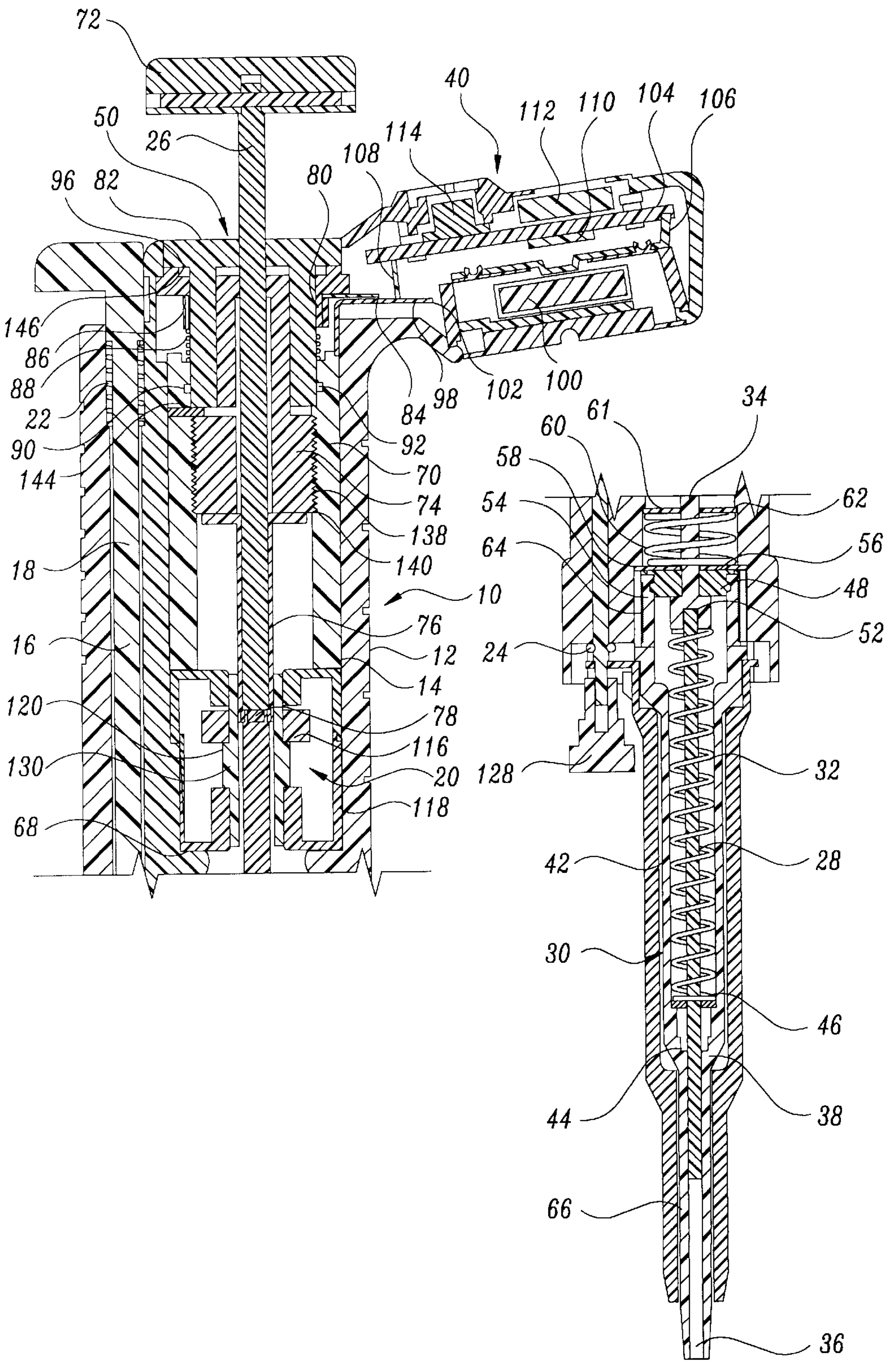
FIG. 3 is a cross-sectional view taken along line III—III of FIG. 2.

More specifically, as shown in FIGS. 1–3, the pipette 10 of the present invention includes a housing 12 having a first generally cylindrical bore 14 passing longitudinally therethrough which contains a transducer assembly 20 centrally located therein, a microswitch assembly 50 positioned at the proximal end thereof and a barrel assembly 30 attached to the distal end thereof to extend outwardly in the distal longitudinal direction. The housing 12 also includes a smaller longitudinal bore 16 containing an ejector rod 18, held in its proximal most position by ejector spring 22 and prevented from escaping the smaller longitudinal bore 16 by O-ring 24. An electronic assembly 40 is attached to the proximal end of the housing 12 and extends away from the housing 12 in a generally perpendicular direction. The housing 12 is designed to be easily gripped in a single hand of an operator such that the electronic assembly 40 remains above the operator's hand for easy viewing by the operator, and the barrel assembly 30 extends below the operator's hand for easy positioning thereof. The pipettor 10 can be operated by manipulation of the ejector rod 18 and the plunger 26 by the user's thumb as will be explained in more detail below.

A more detailed discussion of the transducer assembly portion of the electronic volume monitoring system is included in applicant's co-pending U.S. patent application Ser. No. 08/925,980, now U.S. Pat. No. 5,892,161 entitled "Transducer Assembly for an Electrically Monitored Mechanical Pipette" filed Sep. 9, 1997, which is incorporated herein by reference in its entirety.

ASSEMBLY

Referring again to FIGS. 1–3, assembly of the pipettor 10 of the present invention is preferably initiated with the barrel assembly 30. First, the piston 28 is inserted into the primary spring 32. The proximal end of the piston 28 is then affixed to the piston adaptor 34 and the distal end of piston 28 is inserted into the channel 36 of the barrel housing 42. The fluid channel 36 is sealed against leakage therepast by means of a plug 38, preferably made of Teflon, through which the piston 28 passes and which seats itself in the distal portion of the barrel housing 42 just above the channel 36. The plug 38 is secured for a fluid tight fit against the piston 28 by the seal 44. The seal 44 and plug 38 are held in the distal portion of the barrel housing 42 by washer 46 which is biased downward by the primary spring 32. The force of the washer 46 against the seal 44 assists the seal 44 in squeezing the plug 38 against the piston 28 and also assists in forcing the plug 38 downward against the proximal end of the channel 36. This assists in preventing fluid leakage out of the channel 36. Finally the annular disk 48 is inserted over the piston adaptor 34 and snap-fit into the distal opening of the barrel housing 42. The enlarged end 52 of the piston adaptor 34 is larger in diameter than the annular disk opening 54 and allows the piston adaptor 34 to move longitudinally relative to the barrel housing 42 yet does not allow it to be completely removed therefrom. This completes barrel assembly 30.

Turning now to the housing 12, the primary washer 56 is inserted into the distal end of the housing 12 until it abuts with the shoulder 62 thereof. The secondary spring 60 is then inserted into the distal end of the housing 12 until it abuts primary washer 56. The secondary washer 61 is then placed against the secondary spring 60 to abut with shoulder 58 of the housing 12. The primary washer 56, secondary spring 60 and secondary washer 61 are then permanently held in place within the housing 12 by press fitting the bushing barrel 64 into the distal end of the housing 12. The bushing barrel 64 is threaded on its interior surface and the proximal end of the barrel housing 42 of the barrel assembly 30 is threaded on its exterior surface. In this manner, the entire barrel assembly 30 can be removably attached to the housing 12 by threading the barrel housing 42 into the bushing barrel 64. A further description of the barrel assembly 30, including alternative embodiments thereof, is included in co-pending U.S. application Ser. No. 08/926,095 entitled "Detachable Pipette Barrel" filed Sep. 9, 1997, which is incorporated herein by reference in its entirety.

Figure 4:
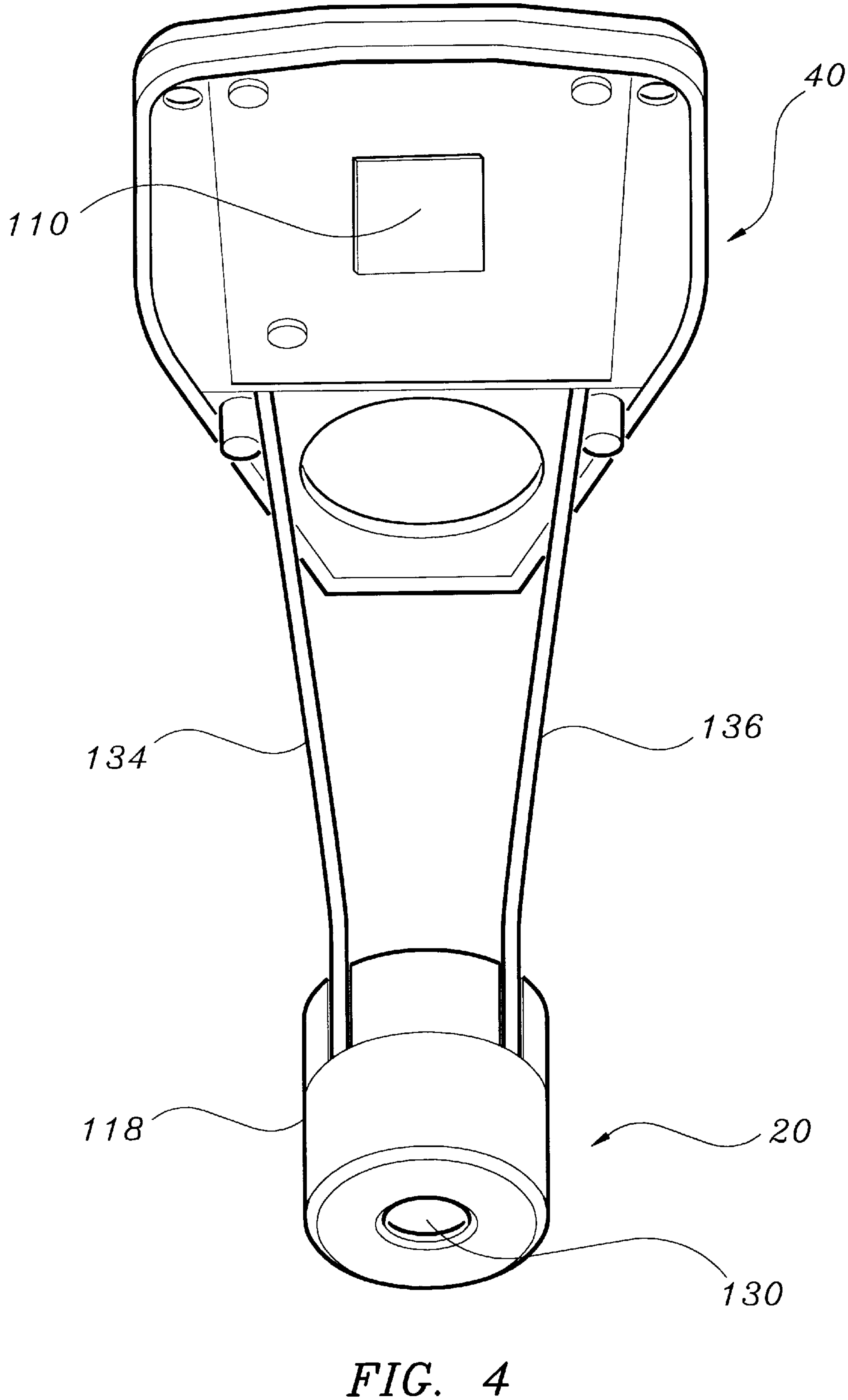
FIG. 4 is a perspective view of a preferred embodiment of an electronics assembly and a transducer assembly made in accordance with the principals of the present invention.
Figure 6:
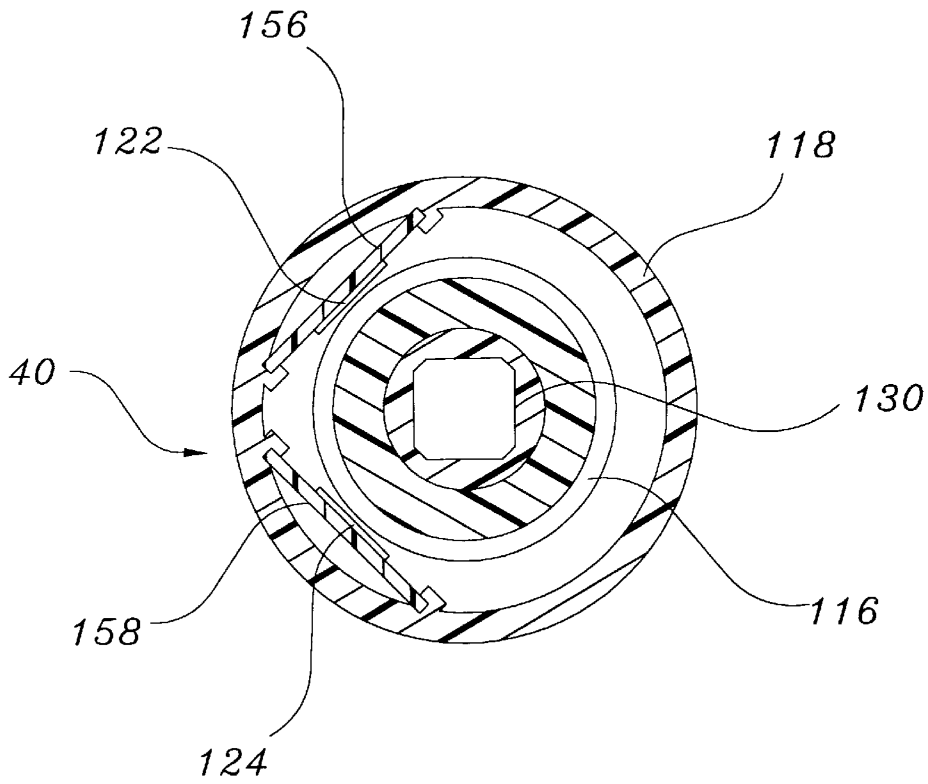
FIG. 6 is a cross-sectional view taken along line VI—VI of FIG. 5.
Figure 5:
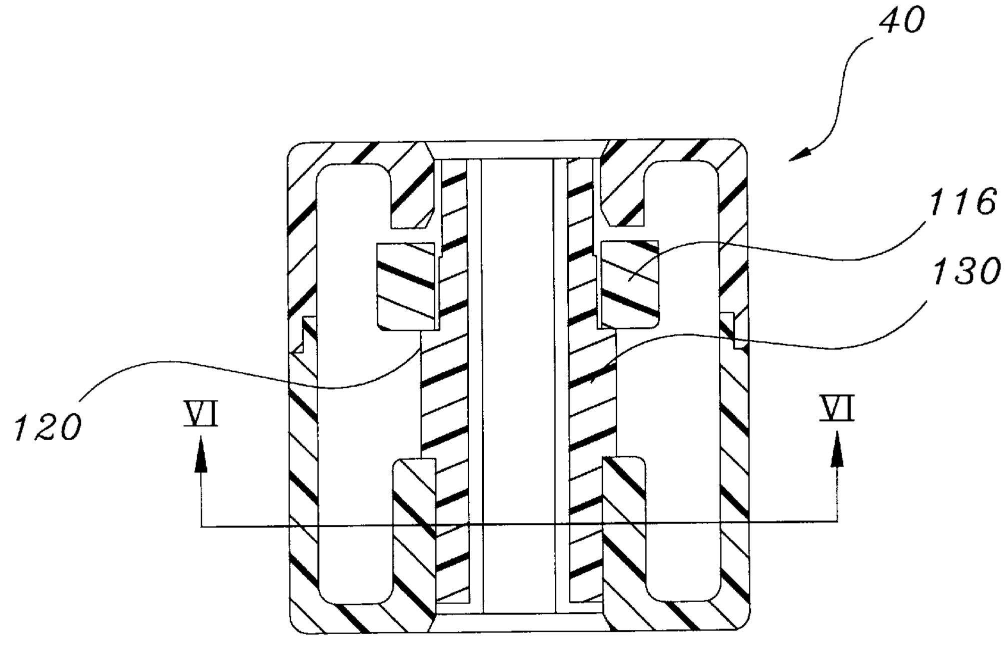
FIG. 5 is a view of a transducer assembly made in accordance with the principals of the present invention.

Referring now to FIGS. 3–5, the transducer assembly 20 includes an annular magnet 116 encased in the transducer housing 118 and held in position on the transducer bearing 130 by abutment against shoulder 120. Sensors 122 and 124 are positioned within the transducer housing 118 at positions 90° apart from each other. The sensors 122 and 124 operate to track the rotation of the annular magnet 116. Leads 134 and 136 extend from the sensors 122 and 124 up to the electronics assembly 40 to allow the sensor signals to pass to the electronics assembly 40, as will be explained in more detail below.

As best seen in FIG. 3, the square plunger 26 is next inserted through the advancer 74. The transducer driver 76 is then inserted over the distal end of the plunger 26 and attached to the distal end of the advancer 74 by means of screws or the like. The distal end of the transducer driver 76 forms a reduced diameter threaded extension to which a small bushing 78 is threadedly attached. The small bushing 78 is of a larger diameter than the plunger 26 and thus interferes with the distal end of the transducer driver 76 to preventing the plunger 26 from being withdrawn therefrom.

Figure 7:
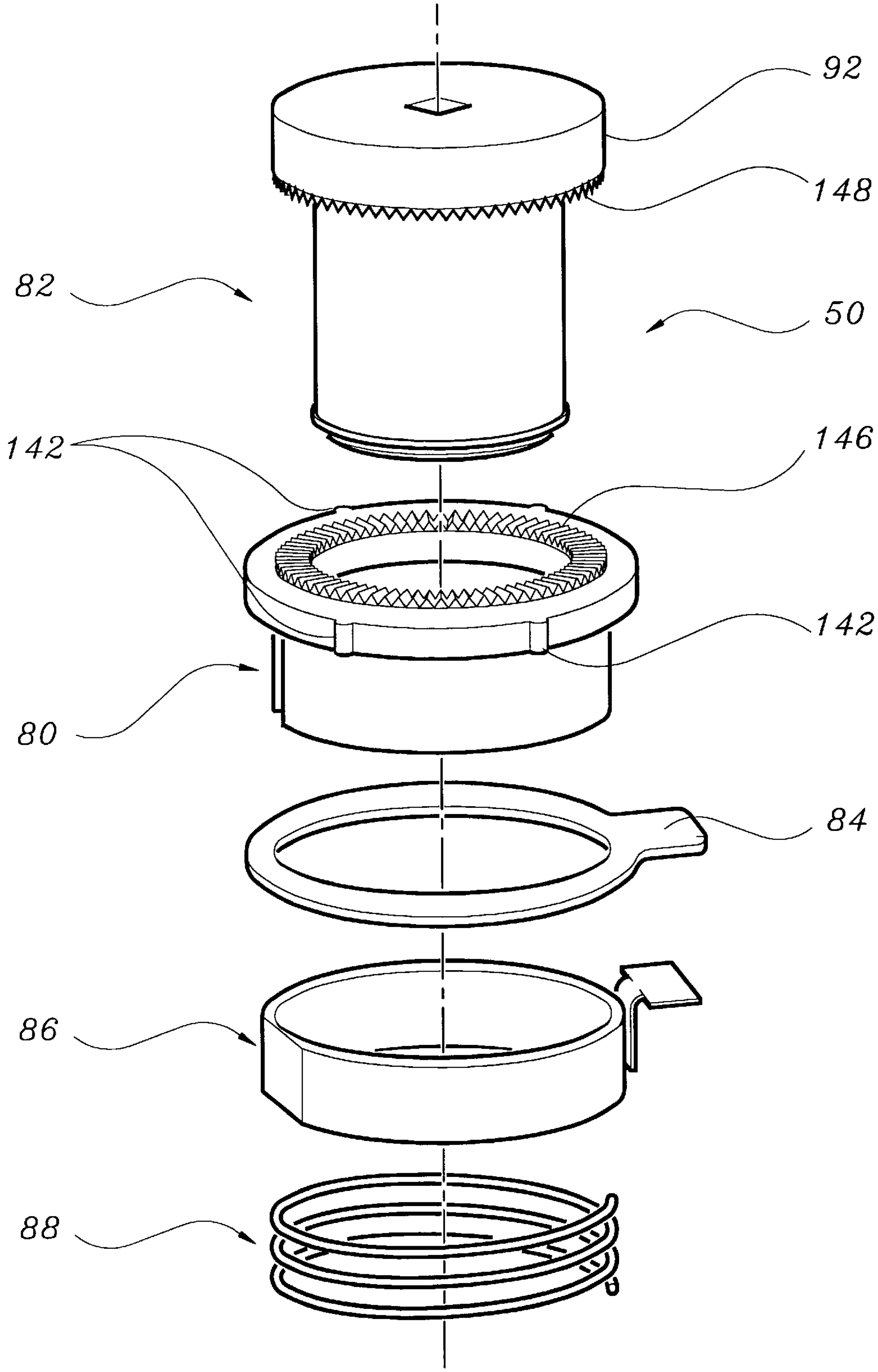
FIG. 7 is an exploded view of a preferred embodiment of a microswitch assembly made in accordance with the principals of the present invention.

Referring now to FIGS. 3 and 7, the microswitch assembly 50 is assembled by first sliding the square opening of the bobber guide 82 over the proximal end of the plunger 26, and attaching the button 72 to the proximal end of the plunger 26. Next, the bobber 80 is inserted over the bobber guide 82 and the bobber switch 84 is inserted over the bobber 80 and held in place by the retaining ring 86. The bobber spring 88 is then inserted over the bobber guide 82 until it abuts against the retaining ring 86 and the retainer 90 is attached to the distal end of the bobber guide 82. Threads 138 of the advancer 74 are then advanced into the threads 140 of bushing 70. The bobber guide 82 is then inserted into the bushing 70 until the retainer 90 snap fits into a retainer slot 92 in the interior annular surface of the bushing 70 just above threads 140. This action causes the bobber spring 88 to be biased between the retaining ring 86 and shoulder 94 in the proximal end of the bushing 70. In this manner, the bobber 80 is always biased upward against the enlarged flange portion 96 of the bobber guide 82. When completely assembled, the bobber 80 is prevented from rotating by the keys 142 thereon which match keyways (not shown) in bore 16. Similarly, pin 144 prevents the advancer 74 from rotating above the threaded portion of the bushing 70, and a key and keyway (not shown) are used to prevent rotation of the transducer housing 118. Thus, rotation of button 72 by the operator causes the plunger 26, advancer 74 and transducer driver 76 to rotate and translate in the upward or downward direction. Translational (longitudinal) distance is controlled by the pitch of threads 138 and 140, and the number of rotations of the button 72.

Likewise, rotation of button 72 causes rotation (but not translation) of bobber guide 82, transducer bearing 130 and annular magnet 116.

The rotational motion of the bobber guide 82 causes the bobber 80 to move downwardly. Since the bobber 80 is held against rotation by the keys 142 positioned in keyways (not shown) in the bore 16, the bobber 80 must move downwardly to unmesh bobber teeth 146 from bobber guide teeth 148. This downward motion causes the bobber switch 84 to contact the stationary switch pad 98, and continues until the bobber teeth 146 slip past the bobber guide teeth 148. The bobber 80 is then biased upwardly again by bobber spring 88. This continues as further rotation occurs, and results in a "bobbing" motion of bobber 80 until rotation of the button 72 is stopped.

Once the transducer assembly 20 and microswitch assembly 50 are completed, the transducer assembly 20 is inserted into the housing 12 through the proximal opening of bore 14 and held in position against shoulder 68 by bushing 70. The bushing 70 includes flattened surfaces (not shown) which form small longitudinal channels (not shown) in conjunction with the bore 14, through which the leads 134 and 136 pass from the transducer assembly 20 to the electronics assembly 40.

The stationary switch pad 98 is held in position at the top of the housing 12 by screws or the like, and a portion thereof extends into the bore 14 to contact and assist in retaining the bushing 70 in its proper position within the bore 14. The bobber switch 84 extends over and above the stationary switch pad 98 and is held in a spaced apart position therefrom by the bobber spring 88.

Figure 8:
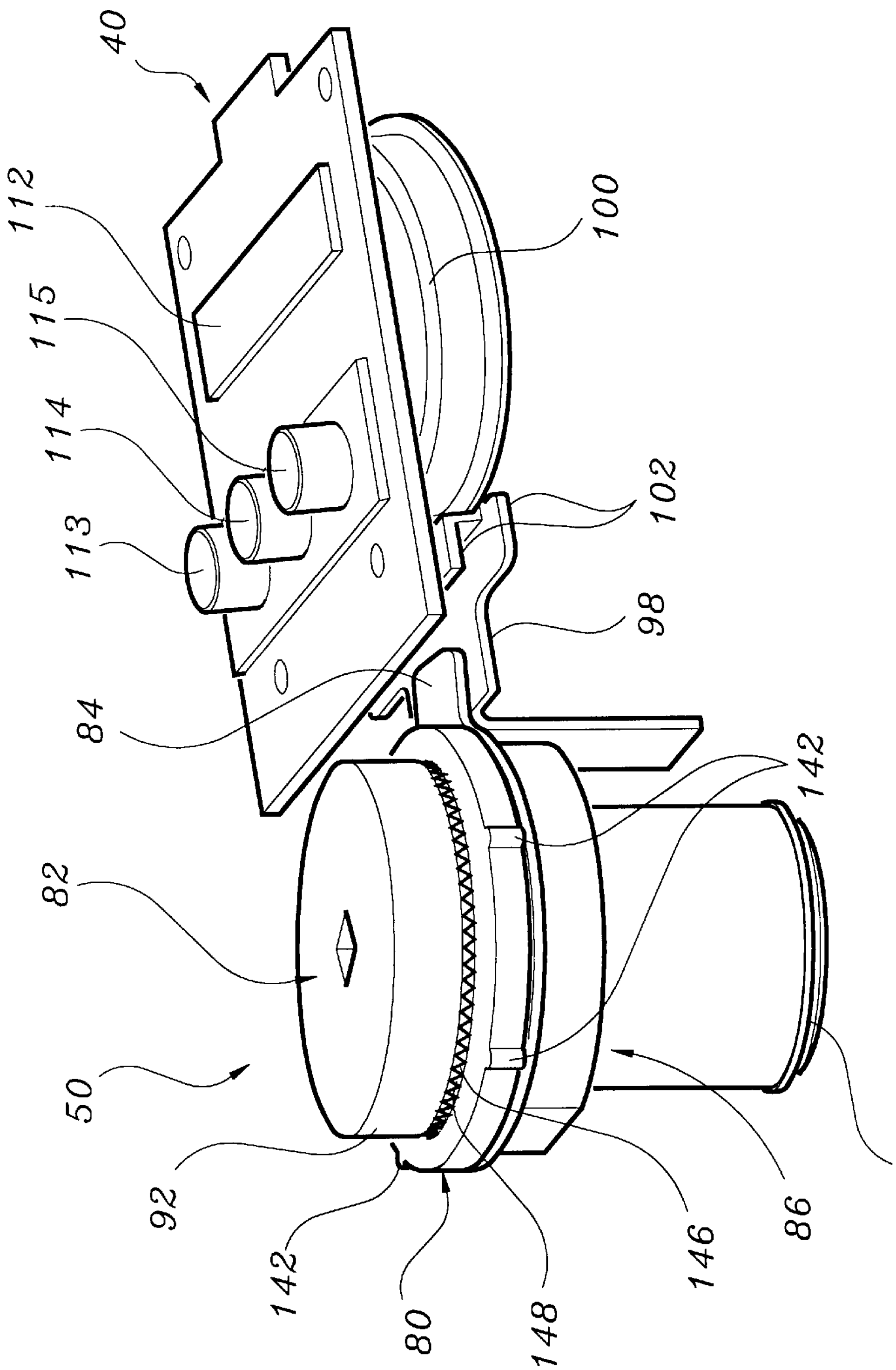
FIG. 8 is a perspective view of a preferred embodiment of a microswitch assembly and an electronics assembly made in accordance with the principals of the present invention with the housing of the electronics assembly removed.
Figure 9:
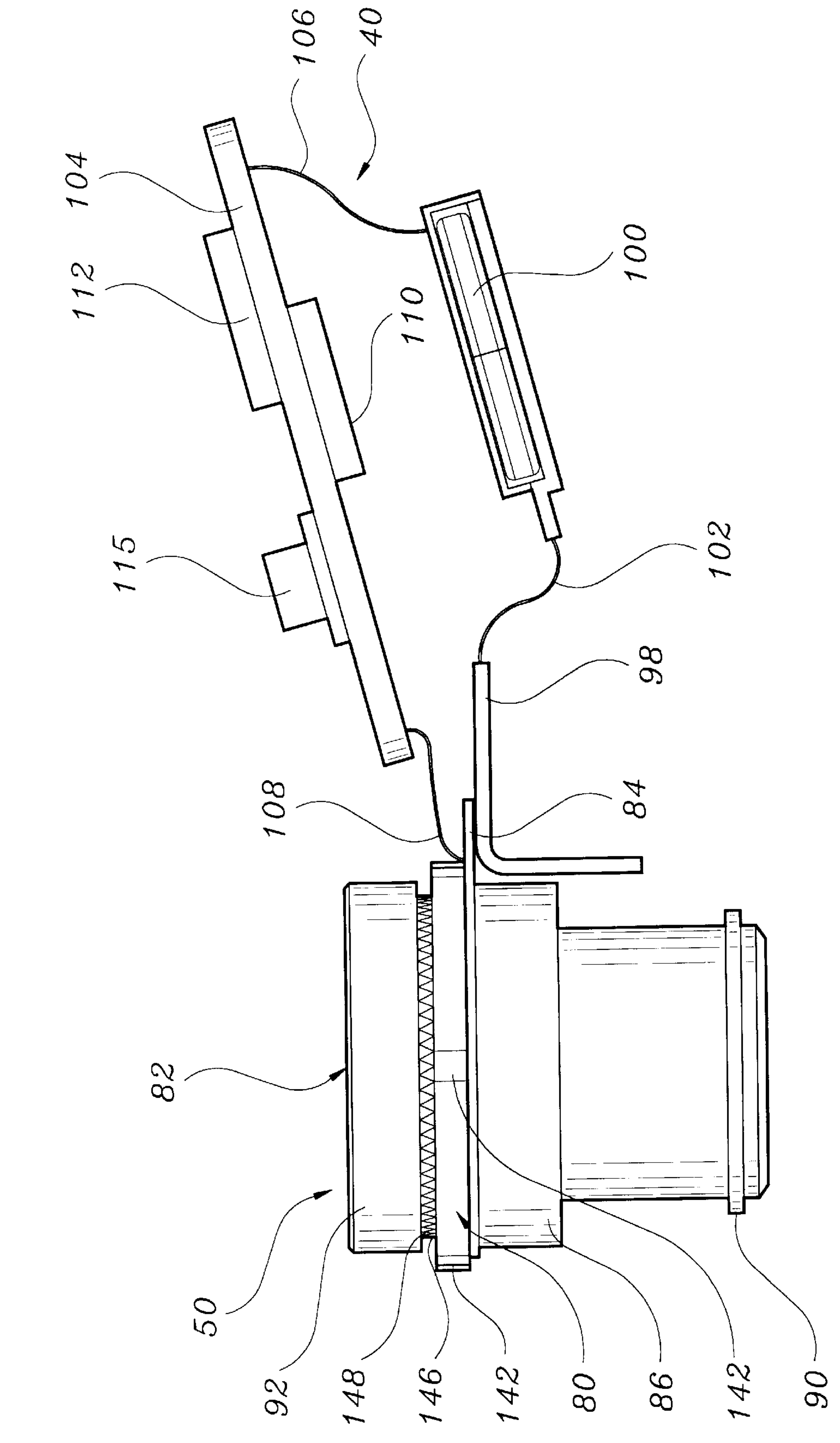
FIG. 9 is a side view of the microswitch assembly and electronics assembly of FIG. 8.

As shown in FIGS. 8 and 9, the stationary switch pad 98 is in electrical contact with the electronic assembly 40 and likewise forms part of the electrical volume monitoring system by being attached to the negative side of the batteries 100 through lead 102 and to the positive side of the circuit board 104 by lead 106. The circuit board itself is connected to the positive side of the batteries 100 by lead 108. The circuit board 104 has attached thereto the microprocessor 110, the LCD display 112, the calibration buttons 113, 114, 115 and the leads 134 and 136 from the transducer assembly 20.

Finally, referring now to FIG. 3, the ejector spring 22 is inserted over the ejector rod 18 and the ejector rod 18 is subsequently inserted through the small bore 16 of the housing 12. The O-ring 24 is attached to a distal portion of the rod 18 to retain it within the small bore 16. The distal end of ejector rod 18 is threaded and sized to receive the ejector barrel 66 which is held in place by nut 128.

In use, a disposable pipette tip (not shown) is attached to the distal end of the barrel housing 42 to be in fluid flow communication with the fluid channel 36 and to abut the distal end of the ejector barrel 126. When it is desired to dispose of the pipette tip, the operator presses down on the ejector rod 18 with the thumb of the hand holding the pipette 10. This causes the ejector rod 18 and the ejector barrel 66 to move distally and push the pipette tip off of the distal end of the barrel housing 42.

The transducer assembly 20 allows the electronics assembly 40 to determine the angular position of the volume delivery adjustment mechanism, and thus the fluid volume delivery setting of the pipette 10. The transducer assembly generates signals from preferably two Hall-effect sensors 122 and 124 which are oriented 90° from each other. These sensors 122 and 124 are positioned equidistant from the perimeter of annular magnet 116. As the annular magnet 116 rotates, its magnetic field also rotates. This results in the two sensors 122 and 124 generating nearly sinusoidal outputs that differ in phase by 90°. This phase difference allows the electronics assembly 40 to determine the position of the volume delivery adjustment mechanism and thus the fluid volume delivery setting of the pipette. The preferred Hall-effect sensors 122 and 124 are relatively high impedance surface mount, linear, sensors. A sensor of this type which is preferable for use with the present invention is manufactured by Toshiba as THS129. Each sensor 122 and 124 are surface mounted on a board 156 and 158 respectively, and each includes an amplifier such as is common in the art. An amplifier suitable for use with the present invention is manufactured by Analog Devices as AD626. These amplifiers are a single supply, low voltage, and low power amplifiers.

The output of the transducer assembly 20 is directly proportional to the magnetic field that is applied to the Hall-effect sensors 122 and 124. The sensitivity of the Hall-effect sensors 122 and 124 is controlled by fixed resistors (not shown) which is common in the art. The single fixed control resistor for each of the sensors 122 and 124 were selected based on the physical dimensions of the transducer assembly 20 and the distance between the annular magnet 116 and the sensors 122 and 124 after assembled in the pipette 10. The value of the resistors was influenced by the sensitivity thereof to the applied magnetic field, the insensitivity thereof to external magnetic fields, and the required dynamic range for the output signals from the sensors 122 and 124 as is understood in the art. Further, the resistors were optimized according to the desired amount of overlap between the signals from the sensors 122 and 124. In order to minimize signal errors, a dynamic range is maximized within the limits of the desired signal overlap.

The annular magnet 116 is formed of an injection molded plastic body having magnetic media suspended within the plastic. During manufacture of the annular magnet 116, while the plastic thereof is in a molten state, the magnetic media is oriented diametrically across the diameter thereof and is magnetized preferably to approximately 400 Gauss. By orienting and magnetizing the annular magnet 116 across its diameter, the annular magnetic 116 generates a field similar to a bar magnet.

When the annular magnet 116 is rotated, the sensors 122 and 124 of the transducer assembly sense the changes in the magnetic field, and their outputs change proportionally with the magnetic field. As the south pole of the annular magnet 116 approaches the sensors 122 and 124, the output thereof grows in a positive direction. As the north pole of the annular magnet 116 approaches the sensors 122 and 124, the output grows in a negative direction. This increase and decrease in output yields a nearly sinusoidal output signal from each of the sensors 122 and 124.

Figure 10:
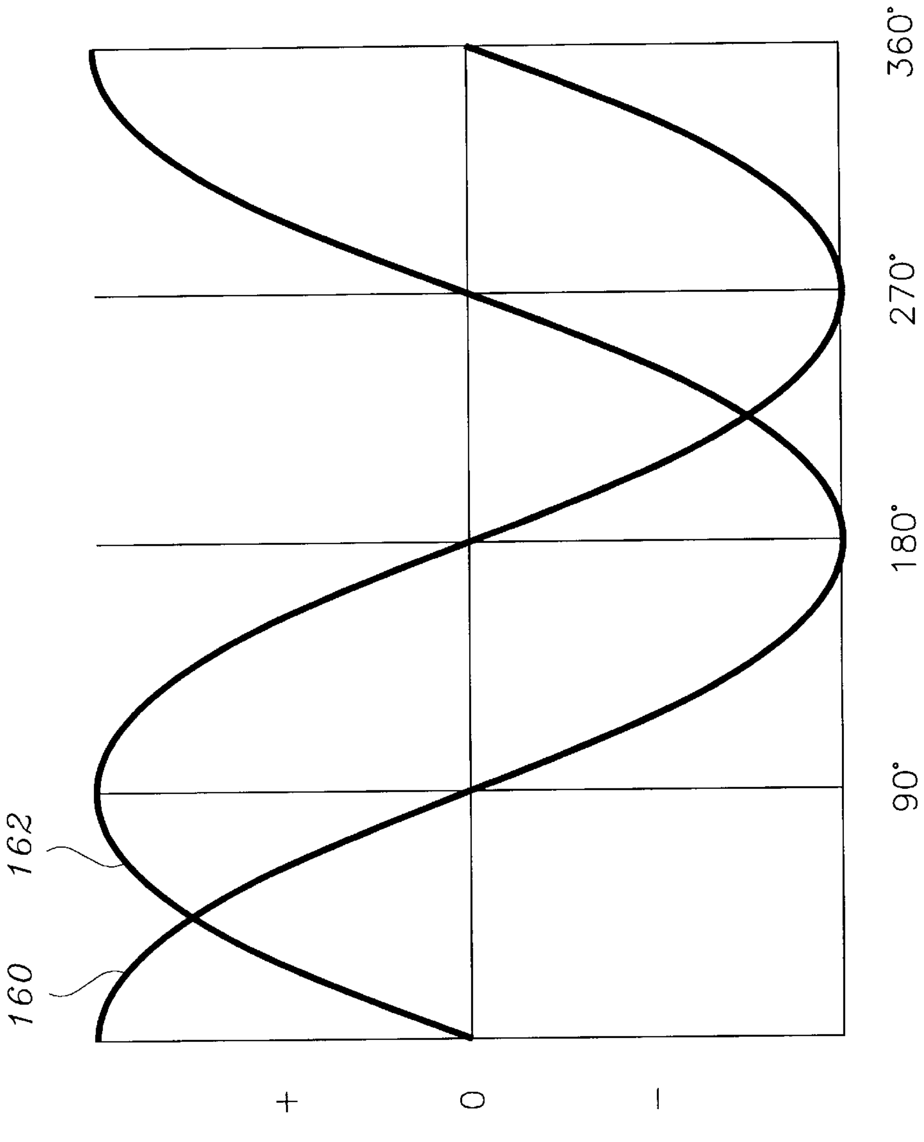
FIG. 10 is a graph of outputs of two Hall-effect sensors of a transducer assembly made in accordance with the principals of the present invention.

The phase relationship of the sinusoidal signals from the sensors 122 and 124 make it possible to determine the 35 exact rotational position of the volume delivery adjustment mechanism. The position is determined by the electronics assembly 40 based on the current signal levels it is receiving from each sensor 122 and 124. Referring to FIG. 10, the transducer signals 160 and 162 from sensors 122 and 124 respectively are shown for one complete rotation of the volume delivery adjustment mechanism of the pipette 10. The graph is marked in increments of 90° rotation to form four 90° quadrants. Each 90° quadrant marking is placed such that one of the signals 160 or 162 is changing from positive to negative and the other signal 160 or 162 is remaining either in its positive or negative state as it passes the quadrant line.

The sine-cosine combination of signals 160 and 162 provides several important advantages in monitoring the position of the volume delivery adjustment mechanism. First, the resolution of each signal 160 and 162 vary significantly relative to the phase of the sinusoidal wave form. For example, the angular resolution of signal 160 is very good at or near the 0° and 180° positions where the signal 160 varies quickly with small changes in rotational position of the volume delivery adjustment mechanism. However, at the 90° and 270° positions, signal 160 no longer changes significantly with the angular rotation of the volume delivery adjustment mechanism. Fortunately, since the signal 162 is 90° out of phase from signal 160, its optimum resolution for detecting rotation of the volume delivery adjustment mechanism occurs at the precise positions where the signal 160 resolution is poor.

Another advantage of the sine-cosine combination of signals 160 and 162 is the ability to determine direction of rotation of the volume delivery adjustment mechanism based on the relative change of signal values from signals 160 and 162. This features also makes it very simple for the electronics assembly 40 to identify and tally all rotations of the volume delivery adjustment mechanism.

An added, and possibly most important advantage of the sine-cosine combination is the ability to discern the difference between a volume delivery adjustment mechanism position in the first 180° of rotation, and the second 180° of rotation. With only a single sinusoidal signal, the repeating waveform would be indistinguishable between a first half and a second half of a full rotation of the volume delivery adjustment mechanism. This is because the sine function is equal at corresponding points between the first and second half of a whole rotation. However, the addition of the second signal allows comparison thereof with the first signal and allows easy identification of the position of the volume delivery adjustment mechanism in each quadrant of its rotation.

Referring again to FIG. 10, it can be seen that in the first quadrant of rotation of the volume delivery adjustment mechanism, between 0 and 90°, signal 160 is positive and decreasing while signal 162 is positive and increasing. However, at the 90° position, signal 162 becomes negative, so that the second quadrant, from 90° to 180°, is identifiable by the electronics assembly 40 as being the quadrant in which signal 160 is negative and signal 162 is positive. Similarly, quadrant 3, from 180° to 270° is the only quadrant in which both signals 160 and 162 are negative. Finally, quadrant 4, from 270° to 360° contains a positive signal 160 and a negative signal 162.

At any chosen angular rotational position of the volume delivery adjustment mechanism signals 160 and 162 present a unique combination of signal values to the electronics assembly 40.

The annular magnet 116, which rotates with the volume delivery adjustment mechanism, is the key variable in determining the volume delivery adjustment setting of the pipette. The three major components which are essential for volume delivery setting determination are the relative position within a revolution of the volume delivery adjustment mechanism, the zero volume position from which the electronics assembly is calibrated to recognize the beginning point of the first revolution of the volume delivery adjustment mechanism, and the number of revolutions which have occurred from that zero position. With these three parameters, the electronics assembly 40 can compute the absolute position of the volume delivery adjustment mechanism, meaning the position in total number of revolutions plus the number of rotational degrees in the last revolution, from the zero position.

The manner in which the pipette 10 of the present invention determines the zero position of the volume delivery adjustment mechanism, and the manner in which the absolute position is calculated to determine the fluid volume delivery setting of the pipette 10, including calibration thereof is detailed below.

OPERATION

The pipette 10 of the present invention operates as follows. The operator, using the thumb of the hand holding the pipette 10, presses down on button 72 until the small bushing 78 on the distal end of the plunger 26 touches the primary washer 132. This motion is resisted by the primary spring 32 through the piston adaptor 34. This motion also brings the piston 28 downwardly along the channel 36. The operator then inserts the distal end of the pipette 10 (with a disposable pipette tip mounted thereon) into a fluid to be pipetted. The operator releases the button 72 and the primary spring 32 returns to its fully upwardly extended positions, and draws piston 28 in a proximal direction through the channel 36, causing the pipette tip to be filled with fluid. The operator then inserts the distal end of the pipette tip into the container to receive the fluid and again forces button 72 downwardly with the thumb until the small bushing 78 touches the primary washer 56. The user continues downward force on the button 72 causing the primary washer 132 to also move downwardly against the force of the secondary spring 60 until it is completely compressed. At this point, the preset volume of fluid has been delivered from the pipette tip.

If the operator desires to change the fluid volume delivery setting, the operator rotates button 72 either clockwise to reduce the volume delivery setting, or counterclockwise to increase the volume delivery setting. Rotation of button 72 causes rotation of bobber guide 82, threaded advancer 74, transducer drive 76, transducer bearing 130, and the annular magnet 116. Rotation of the thread advancer 74 (by rotation of button 72) causes the threaded advancer 74 to rotate through the threads 140 on the inside of the bushing 70 and thereby move in a longitudinal direction. This longitudinal movement also forces longitudinal movement of the plunger 26 and the transducer driver 76.

Rotational motion of the bobber guide 82, causes the bobber 80 to be forced downwardly in the distal direction against the bobber spring 88 until the bobber switch 84 contacts the stationary switch pad 98. Since the bobber 80 is keyed to the housing 12, and therefore cannot rotate, it moves downward to allow the meshing teeth 148 of the bobber guide 82 to pass over the meshing teeth 146 of the bobber 80. The individual teeth of the meshing teeth 146 and 148 are preferably sized to cause the bobber 80 to "bob" approximately every 6° of rotation. Each time the bobber is forced downwardly due to rotation of the bobber guide 82, the bobber switch 84 is forced into contact with the stationary switch pad 98. The bobber spring 88 then forces the bobber 80 upwardly again against the bobber guide 82. When the bobber 80 is again in its upwardmost position, the bobber switch 84 is again spaced away from the stationary switch pad 98. The contact of bobber switch 84 with the stationary switch pad 98 sends an interrupt signal to the microprocessor 110 which it recognizes as a signal to power up the sensors 122 and 124 in the transducer assembly 20. A more detailed discussion of the microswitch assembly 50, including alternative embodiments thereof, is included in applicants' co-pending U.S. patent application Ser. No. 08/927,375 entitled "Electronically Monitored Mechanical Pipette" filed Sep. 9, 1997, which is incorporated herein by reference in its entirety.

As the annular magnet 116 rotates, the magnetic field thereof passes through the sensors 122 and 124. As shown in FIG. 10, the sensors 122 and 124 produce a current output based on the changing magnetic field passing therethrough which is sent to the microprocessor 110 through leads 134 and 136. The microprocessor computes a new volume delivery setting based on the signals it receives from the sensors 122 and 124 and displays the new volume setting in display 112.

The electronics assembly 40 both conditions and processes the signals 160 and 162 from the transducer assembly 20. Both transducer signals 160 and 162 feed into a comparator circuit and into the A/D convertor of the microprocessor 110. The comparator circuit of the microprocessor 110 is designed to switch at approximately the midpoint of each of the transducer signals 160 and 162 in the manner known in the art. This allows the signals 160 and 162 to be viewed as square wave signals each having a positive or negative value. In this manner, the microprocessor 110 determines in which quadrant the volume delivery adjustment mechanism is positioned. Referring again to FIG. 10, if both values are positive, the first quadrant is indicated. A positive value for signal 160 and negative value for signal 162 indicates the second quadrant. Two negative values indicate the third quadrant, and a positive value for signal 162 and a negative value for signal 160 indicates the fourth quadrant.

The A/D converter of the microprocessor 110 also allows measurement of the actual voltage of each signal 160 and 162.

In the preferred embodiment of the present invention, the microprocessor 110 contains a calibration map which is programmed therein prior to use. The calibration map includes a complete set of signal values corresponding to the values of signals 160 and 162 at each position of the magnet 116 relative to the sensors 122 and 124. The present value of signals 160 and 162 is compared to the calibration map to determine the rotational position of the volume delivery adjustment mechanism, and thereafter, the fluid volume delivery setting.

Figure 11:
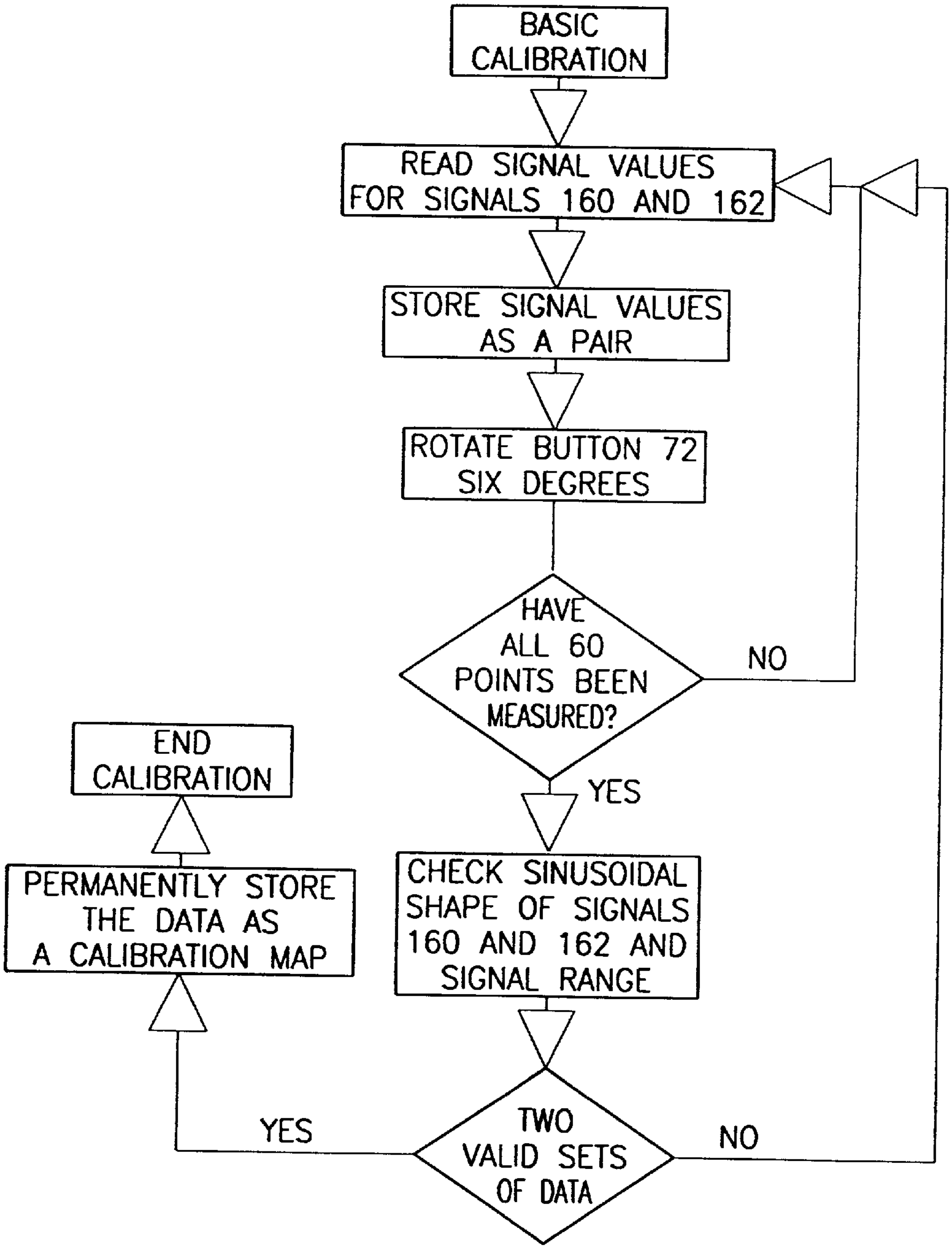
FIG. 11 is a flow chart of the preferred embodiment of the method for generating a calibration map according to the principals of the present invention.

The calibration map is developed by rotating the volume delivery adjustment mechanism through one entire revolution and recording and storing each pair of signal values from signals 160 and 162 at predetermined evenly spaced 6° increments between 0° and 360°. FIG. 11 shows how the calibration map is generated. Initially, the pipette 10 is attached to a calibration fixture (not shown) which requires it to read the signal values for signals 160 and 162. The calibration fixture then stores these signal values and checks to see if it has received sixty pairs of signal values. If not, the fixture rotates the button 72 six degrees (corresponding to one "bob" of the bobber 80) and reads the signal values for signals 160 and 162 in this new position. The fixture again stores the signal values as a pair and checks to see if all sixty points have been measured.

Once sixty pairs of signal values have been stored by the fixture, the fixture will repeat the entire process to develop two complete sets of data.

Next, the data is checked to ensure that the values received from signals 160 and 162 both correspond to a sinusoidally shaped curve and that the range for each signal 160 and 162 is equivalent.

If the validation is successful, the set of data corresponding most accurately to a sinusoidal shaped curve and the desired range equivalency becomes the calibration map, and is stored in the microprocessor 110 and the calibration is completed. Since the sign, positive or negative, of each value is also collected and stored as part of the calibration map, the relative position within a revolution of the volume delivery adjustment mechanism can be determined at any time by comparing the present values of signals 160 and 162 being received by the microprocessor 110, with the calibration map. This is the first step in computing the absolute position of the volume delivery adjustment mechanism.

An alternative approach to computing the relative position of the volume delivery adjustment mechanism includes the use of algorithms preprogrammed into the microprocessor 110. In this embodiment, the present relative position of the volume delivery adjustment mechanism, described in degrees of rotation, may be determined by the algorithm:

$$\text{rel POS}=(\text{slope}\times A)\div 256+\text{offset}$$

Where:

rel POS is the relative position

Slope is the slope of the linear curve bit for the sinusoidal quadrant that the volume delivery adjustment mechanism is presently positioned in.

A is the A/D value for the sensor 160 or 162 used in the sinusoidal quadrant in which the volume delivery adjustment mechanism is presently positioned.

Offset is the "y" intercept of the linear curve bit for the sinusoidal quadrant.

256 is the scale factor built into the slope.

Once the relative position is computed, either by using the calibration map or the algorithm method, the zero volume position, or zero position, must then established. The zero position is defined as the relative position of the volume delivery adjustment mechanism in a particular revolution which corresponds to a zero fluid volume delivery setting. The zero position of the volume delivery adjustment mechanism is easily obtained. First, the user rotates the button 72 clockwise until the threads 138 of advancer 74 are completely threaded into the threads 140 of bushing 70, and the bushing 78 touches the primary washer 56. The user then presses the calibration button 114, the "zero" button, which causes the display 112 to read a zero volume setting. Also, the microprocessor 110 stores the signal values, including the quadrant information and identifies this information as the zero position of the volume delivery adjustment mechanism. In this way, any later setting of the volume delivery adjustment mechanism to any relative position is normalized with respect to the zero position in order to determine the total rotation of the volume delivery adjustment mechanism away from the zero position.

There are two cases for normalization. The first case is when the relative position is greater than the zero position in any particular revolution. In this case, the normalized position is determined by subtracting the zero position from the relative position. The second case of course describes the situation in which the relative position is less than the zero position in any particular revolution. In this case, the normalized position is determined by subtracting the zero position from the relative position and then adding 360° (one full revolution).

The quadrant information, which includes the positive or negative sign on the signals 160 and 162, is monitored by the microprocessor 110 each time the interrupt from the microswitch assembly 50 occurs. Each time the volume delivery adjustment mechanism rotates far enough to return to the quadrant containing the zero position, one revolution is completed and that revolution is counted by the microprocessor 110. This revolution is added to the total revolution count maintained by the microprocessor 110 if the quadrant information received by the microprocessor 110 indicates that the volume delivery adjustment mechanism was being rotated in the counterclockwise direction (which increases the fluid volume delivery setting), or subtracts one revolution if it determines that the volume delivery adjustment mechanism rotated into the zero quadrant from the opposite direction.

Because the zero position will not usually occur on a quadrant boundary, there is a chance that the revolution count may be incremented before the real zero position is actually reached. In this cases, the revolution count must be decreased by one revolution before it is used to compute the fluid volume delivery setting. In this instance, the microprocessor 110 checks the four quadrant positions under which this could occur and appropriately adjust the revolution count.

By knowing the normalized position and revolution count of the volume delivery adjustment mechanism, the electronics assembly 40 can compute its absolute position as follows:

$$\text{POS } A = (\text{Revs} \times 360) + \text{POS } N$$

Where POS A is the absolute position from the zero position in any revolution of the volume delivery adjustment mechanism.

Revs is the revolution count.

POS N is the normalized position within the revolution.

If the absolute position is within the range for the pipette 10, the fluid volume delivery setting is computed and displayed. If not, an error message is displayed.

Computation of the fluid volume delivery setting is accomplished by multiplying the volume per revolution by the number of revolutions (and partial revolution) of the volume delivery adjustment mechanism from the zero position.

The actual fluid volume delivery setting corresponding to a valid absolute position depends of course on the volume displacement of the piston for each revolution of the volume delivery adjustment mechanism. This is controlled by the pitch of the threads 138 and 140 of the advancer 74 and bushing 70 respectively, and the diameter of the piston 28. In the preferred embodiment of the invention, the pitch of the threads 138 and 140 is preferably approximately 28 threads per inch. The diameter of the advancer 74 and bushing 70 which hold the threads 138 and 140 respectively is preferably ⅝ of an inch. In the preferred embodiment of the invention the diameter of the advancer 74 and bushing 70 is held constant, and the diameter of the piston 28 is changed in order to change the delivery range of the pipette 10. For example, the preferred embodiment of the pipette 10, in which the delivery range is between 0.5 and 10 microliters is 0.0315 inches. For a pipette 10 having a delivery range between 2 and 20 microliters, the diameter of the piston 28 is preferably 0.0440 inches. For a delivery range of 10 to 100 microliters, the diameter of piston 28 is preferably 0.0995 inches. For a delivery range of between 20 and 200 microliters, the diameter of the piston 28 is preferably 0.1440 inches. For a delivery range between 100 and 1000 microliters, the diameter of the piston 28 is preferably 0.3160 inches.

For each delivery range desired by the pipette 10, the preferred diameter of the piston 28 is used therein, and the microprocessor 110 is programmed with the chosen diameter. Since the threads 138 and 140 of the advancer 74 and bushing 70 respectively remain at the same pitch regardless of the diameter change of the piston 28, the microprocessor 110 can directly compute fluid volumes drawn and delivered for any desired delivery range based on the above described calibration mapping or algorithm software without modification thereof, as along as the diameter of the piston 28 is specified to the microprocessor 110.

Once the fluid volume delivery setting is computed and displayed, the user can then turn the knob 72 until the desired fluid volume delivery setting is present in the display 112. When the user stops turning the knob 72, the bobber 80 is again biased to its upward proximal position by the bobber spring 88, and the bobber switch 84 is separated from the stationary switch pad 98. After a short period of time, preferably approximately 100 milliseconds after receiving its last interrupt signal, the microprocessor 110 turns off the power to the transducer assembly 20. The display 112 however remains powered, and continuously displays the current fluid delivery setting. In this manner, when the pipette 10 is not activated to change a fluid delivery setting, the power consumption thereof is limited to the power required to maintain the current fluid delivery setting displayed on the display 112 (approximately 10 microamps). The high power requirements of the transducer assembly 20 (approximately 17.0 milliamps) are only being consumed therefor when the pipette 10 is actually being operated to change its fluid volume delivery setting.

Once the user has chosen a desired fluid flow delivery setting, the user can thereafter check the accuracy of the setting and further calibrate the pipette 10 to be completely accurate on its delivery at the chosen fluid volume delivery setting. To do this, the user performs an accuracy check on the actual volume of fluid being delivered at the fluid volume delivery setting. The user first draws water into the pipette tip in the above desired manner and then dispenses the water onto a scale. The weight of the water actually dispensed by the pipette 10 is then obtained from the scale and compared to the fluid volume delivery setting being displayed on the display 112. Since there is a one to one correspondence between the weight of water in grams and the volume of water in milliliters, the user can readily identify the exact volume of water which was delivered by the pipette 10. If the display 112 is showing a slightly different fluid volume delivery setting, the user adjusts the display by pushing either one of the calibration buttons 113 or 115 to move the display reading either up or down as required to match the display with the actual fluid volume delivered.

It should be noted that calibration at a particular point of use to ensure exact correlation between the actual fluid volume delivered and the fluid volume delivery setting being displayed on display 112 effects only the number being displayed by display 112. The point calibration operation does not change any calibration settings of the microprocessor 110 nor any mechanical settings of the pipette 10.

It will be apparent from the foregoing that, while a particular embodiment of the invention has been illustrated and described, various modifications can be made thereto without departing from the spirit and scope of the invention. Accordingly, it is not intended that the invention be limited, except as by the appended claims.

We claim:

1. A calibration system for an electrically monitored mechanical pipette having an electrical assembly which monitors a volume delivery adjustment mechanism, said calibration system comprising:

a volume delivery adjustment mechanism including a longitudinally and rotationally displaceable actuating member and driving mechanism, said driving mechanism responding to a rotational displacement of said actuating member, a transducer assembly for producing at least two transducer signals related to a rotational displacement of at least a portion of said driving mechanism, an electronics assembly comprising a microprocessor capable of receiving said at least two signals from said transducer assembly, said electronics assembly including a calibration map comprising defined values that have been generated by rotation of at least a portion of the volume delivery adjustment mechanism one fill revolution and recordation at predetermined rotational intervals throughout said one full revolution of the transducer signals generated thereat, said microprocessor further being capable of computing a volume delivery setting based on a comparison of said calibration map defined values with said at least two signals from said transducer assembly, and a display for displaying the computed fluid volume delivery setting.

2. A calibration system according to claim 1 wherein said at least two signals from said transducer assembly are sinusoidal signals which are 90° out of phase from each other.

3. A calibration system according to claim 1 wherein said at least two transducer signals also relate to the direction of said rotation of said at least a portion of said volume delivery adjustment mechanism.

4. A calibration system according to claim 1 wherein said display can be adjusted to change the displayed fluid volume delivery setting without otherwise effecting said electronics assembly or said calibration map.

5. A calibration system for an electrically monitored mechanical pipette having a volume delivery adjustment mechanism and an electronics assembly for monitoring the volume delivery adjustment mechanism, said calibration system comprising:

a volume delivery adjustment mechanism including a longitudinally and rotationally displaceable actuating member and driving mechanism, said driving mechanism responding to a rotational displacement of said actuating member, a transducer assembly for producing at least two transducer signals related to a rotational displacement of at least a portion of said driving mechanism, an electronics assembly including means for determining a fluid volume delivery setting based on a comparison of said at least two signals from said transducer assembly with a calibration map comprising defined values that have been generated by rotation of at least a portion of the volume delivery adjustment mechanism one full revolution and recordation at predetermined rotational intervals throughout said one full revolution of the transducer signals generated thereat, and a display for displaying the computed fluid volume delivery setting.

6. A calibration system according to claim 5 wherein said means for computing a fluid volume delivery setting incudes a calibration map.

7. A method for calibrating an electrically monitored mechanical pipette including a volume delivery adjustment mechanism having a longitudinally and rotationally displaceable actuating member and driving mechanism, the driving mechanism responding to a rotational displacement of the actuating member and an electronics assembly for monitoring the volume delivery adjustment mechanism, the electronics assembly receiving at least two transducer signals from a transducer assembly which relate to a rotational displacement of at least a portion of the volume delivery adjustment mechanism, said method comprising the steps of:

generating a calibration map of the at least two transducer signals by:

reading the signal values from the at least two transducer signals;

storing the signal values as a pair;

rotating the volume delivery adjustment mechanism a predetermined rotational distance;

checking to see if all predetermined signal values have been read and stored; and repeating said step of reading signal values of the at least two transducer signals until all signal values related to each predetermined rotational position of the volume delivery adjustment mechanism have been read and stored as a calibration map.

8. A method according to claim 7 wherein said method of calibration further includes the steps of:

reading and storing signal values for two complete calibration maps, checking the sinusoidal shape of the two sets of signals for each calibration map; and choosing the calibration map which corresponds most accurately with sinusoidal shaped transducer signals.

9. A method according to claim 7 wherein the electrically monitored mechanical pipette further includes a display for displaying a fluid volume delivery setting, said method further including the step of:

displaying a fluid volume delivery setting in the display that has been computed by the calibration map.

10. A method according to claim 9 further including the steps of:

measuring the actual fluid delivered by the pipette at a given fluid volume delivery setting being displayed by the display; and adjusting the fluid volume delivery setting being displayed by the display to reflect the actual measured fluid delivery volume.

11. A method according to claim 10 wherein said step of adjusting the fluid volume delivery setting on the display includes pressing at least one display adjustment button located adjacent the display.

12. An electronically monitored mechanical pipette comprising:

a volume delivery adjustment mechanism including a longitudinally and rotationally displaceable actuating member and transducer driving mechanism, said transducer driving mechanism responding to a rotational displacement of said actuating member, a transducer assembly for producing at least two transducer signals related to a rotational displacement of said transducer driving mechanism, an electronics assembly comprising a microprocessor capable of receiving said at least two signals from said transducer assembly, said electronics assembly including a calibration map for computing a volume delivery setting based on said at least two signals from said transducer assembly, and a display for displaying the computed fluid volume delivery setting.

* * * * *

UNITED STATES PATENT AND TRADEMARK OFFICE
CERTIFICATE OF CORRECTION

PATENT NO. : 5,998,218
DATED : December 7, 1999
INVENTOR(S) : Conley et al.

It is certified that error appears in the above-identified patent and that said Letters Patent is hereby corrected as shown below:

Column 2,
Line 9, the word "when" should be changed to -- which --.

Column 6,
Line 39, the word "preventing" should be changed -- prevent --.

Column 9,
Line 24, the word "features" should be changed to -- feature --.

Column 13,
Line 14, the word "mechanism rotated" should be changed to -- mechanism was rotated --.
Line 18, the word "cases" should be changed to -- case --.

Signed and Sealed this

Fifteenth Day of January, 2002

Attest:

JAMES E. ROGAN
*Director of the United States Patent and Trademark Office*

*Attesting Officer*